E. G. COLLINS.
HARROW.
APPLICATION FILED MAY 8, 1918.
1,299,553.
Patented Apr. 8, 1919.
2 SHEETS—SHEET 1.
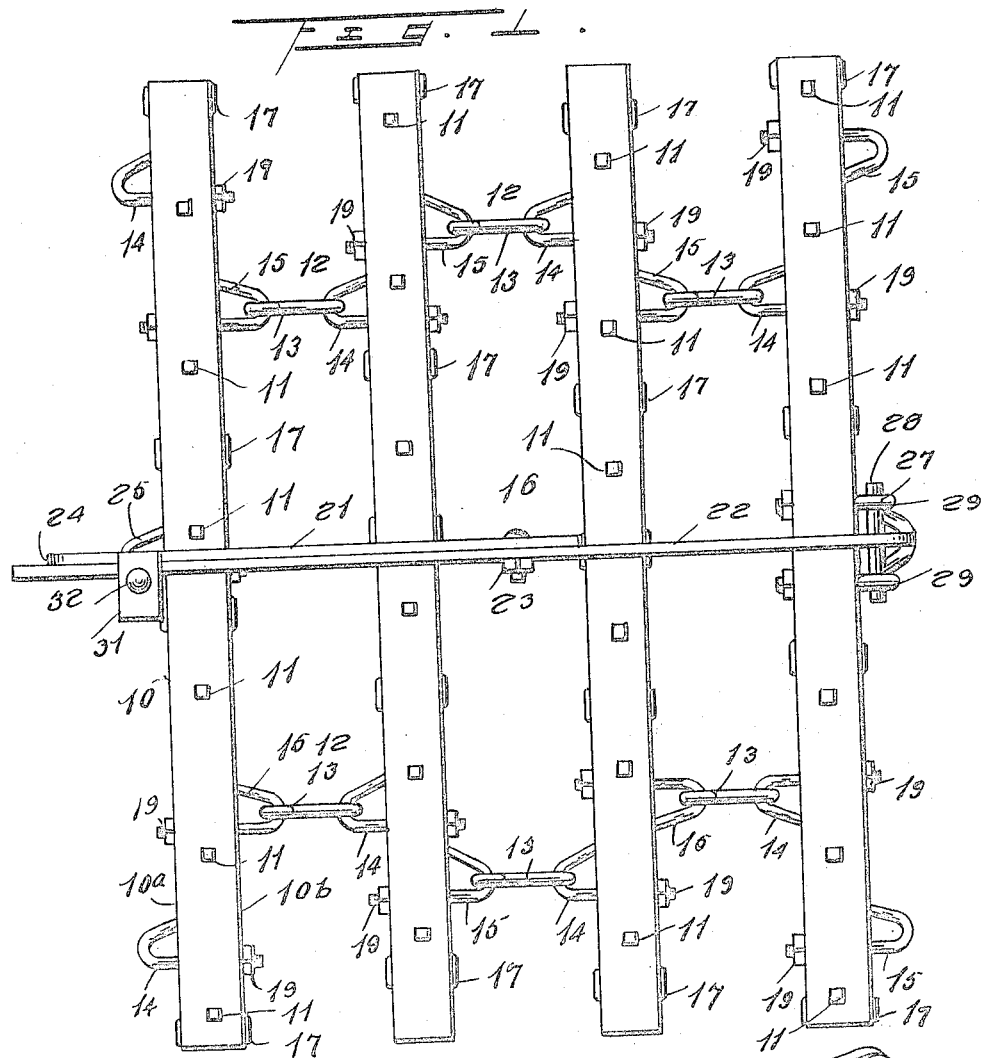
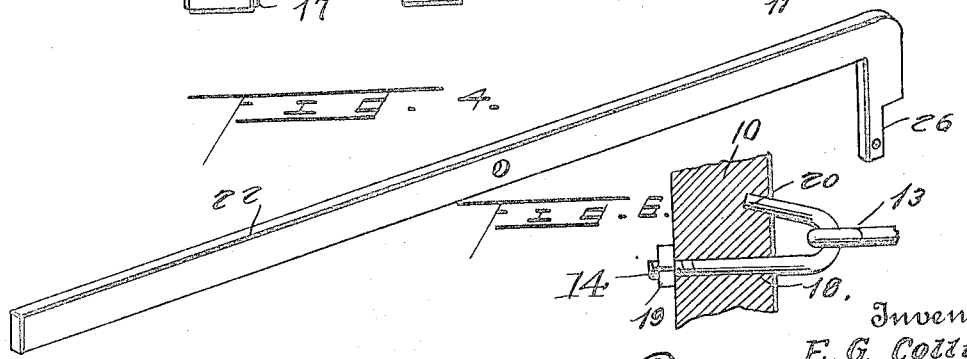
Inventor
E. G. Collins.

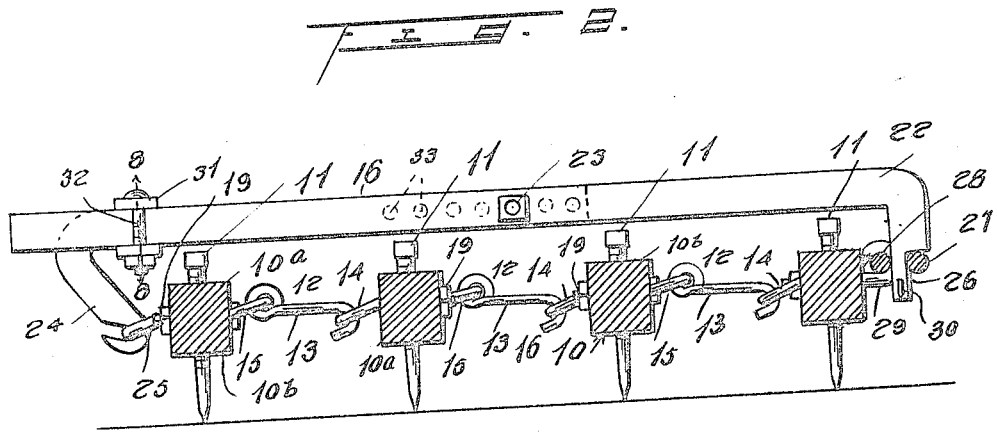
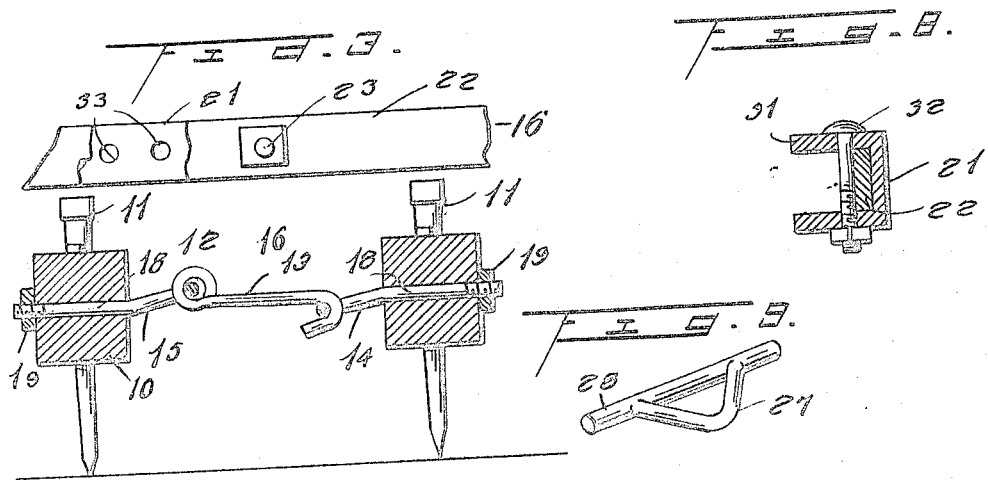
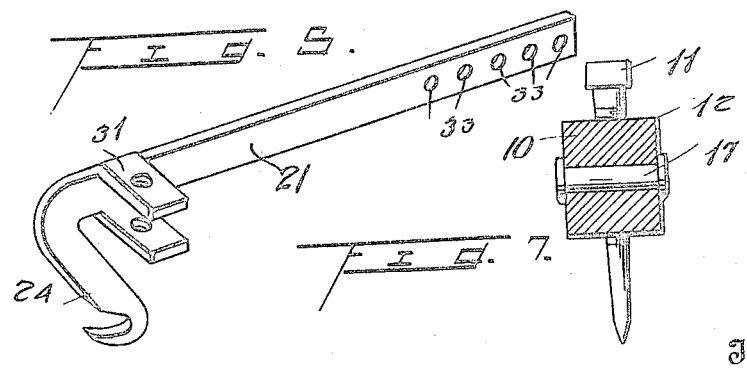

UNITED STATES PATENT OFFICE.

EARL G. COLLINS, OF PEMBROKE, KENTUCKY.

HARROW.

1,299,553.　　　　Specification of Letters Patent.　　Patented Apr. 8, 1919.

Application filed May 8, 1918. Serial No. 233,276.

*To all whom it may concern:*

Be it known that I, EARL G. COLLINS, a citizen of the United States, residing at Pembroke, in the county of Christian and State of Kentucky, have invented certain new and useful Improvements in Harrows; and I do hereby declare the following to be a full, clear, and exact description of the invention, such as will enable others skilled in the art to which it appertains to make and use the same.

The object of the invention is to provide a simple and relatively inexpensive harrow structure whereof the elements or members may be folded or arranged in compact form when not in use and may be rigidly held in either of a plurality of adjusted relations when shut up for operation, the connections between the parts being capable of ready adjustment and engagement and may be replaced at small cost in the event of breakage or injury.

Further objects and advantages will appear hereinafter, it being understood that changes in form, proportion and details may be resorted to within the scope of the appended claims without departing from the spirit of the invention.

In the drawings:

Figure 1 is a plan view of the harrow.

Fig. 2 is a longitudinal sectional view of the same.

Fig. 3 is a detail sectional view taken in the plane of one of the connections between adjacent tooth carrying members.

Fig. 4 is a detail view in perspective of one of the elements of the ridge member.

Fig. 5 is a similar view of the other element of the ridge member.

Fig. 6 is a detail sectional view showing the attachment of one of the link connections with the harrow bar or member.

Fig. 7 is a vertical sectional view of one of the harrow bars or members showing the means for securing the parts thereof in their proper relation.

Fig. 8 is a detail transverse section of the ridge member on the line 8—8 of Fig. 2 to show the means for holding the elements thereof in their operative relations.

Fig. 9 is a detail view of the rocking shackle with which one end of the ridge member is engaged.

The harrow consists essentially of the transverse tooth bars or members 10 carrying the teeth 11 and connected in series by couplings 12 consisting of hooks 13 and staples 14, said hooks being respectively connected with the tooth bars or members by staples 15, preferably corresponding in construction with the staples 14, and a ridge member or stretcher 16 which is detachably engaged with the foremost and rearmost tooth bars or members to hold them and the intermediate bars or members in their proper operative relations.

In the construction illustrated, each tooth bar or member is provided at intervals with transversely extending rivets 17, so as to minimize the possibility of splitting the bars or members by reason of the strain upon the harrow teeth, and the staples 14 and 15 are provided with bolt arms 18, as shown in detail in Figs. 3 and 6, which extend through the tooth bars or members and are engaged by nuts 19. The free ends of the rods forming the staples, as shown at 20, are countersunk in the bars or members to strengthen the staples, and the staples 14 are preferably deflected downwardly, while the staples 15 are deflected upwardly, so that a straight horizontal draft is applied to the shanks of the hooks or swinging elements of the couplings 12.

Obviously, the tooth bars or members may be arranged in compact relation when disconnected, and when the coupling members are properly related, the said bars or members are held rigidly in operative position by a ridge member, 16 as above noted, which preferably consists of two elements 21 and 22, pivotally connected as at 23 by a suitable bolt, the member 21 having a depending hook 24 for engagement with a staple 25 on one of the marginal tooth bars or members while the member 22 is provided with a tongue 26 for engagement with the loop 27 of a rocking shackle shown in detail in Fig. 9 and having a rocker or spindle 28 mounted in bearings 29 formed by twin staples projecting from the other marginal tooth bar or member. The tongue 26 is held in engagement with the rocking shackle by means of a key 30 engaged with an opening in the end of the tongue, and the element 21 of the ridge member or stretcher is provided with a clamp 31 consisting of upper and lower ears between which the free end of the element 22 is adapted to be engaged when the elements of the ridge member are arranged in substantial alinement and the structure is stretched longitudinally to hold the tooth bars or members in their operative relation, as shown in Figs. 1 and 2.

A locking bolt 32 may be used to connect the ears of the clamp after the engagement of the free end of the element 22 therewith, so as to guard against accidental disengagement.

In order that the length of the ridge member may be adjusted to suit the conditions, the number of tooth bars or members employed and the inclination which the said bars or members are preferred to have in operation, the element 21 is provided with a plurality of openings 33 for engagement by the pivot bolt 23, and after the outer terminals of the elements of said ridge member are engaged, respectively, with the marginal tooth bars or members, the free end of the lever member 22 may be drawn down into alinement with the member 21 and engaged with the clamp or holding means 31, to secure the parts in their adjusted positions.

From the foregoing description it will be obvious that the several elements of the device are of simple construction and their means of connection are such as to provide for arranging any desired number of tooth bars or members in a battery or composite structure, and when the said bars or members are so connected, they may be locked in operative relation, to properly present the teeth to the surface of the soil by the adjustment and locking of the ridge member as above explained. It will also be obvious that the loosening and removal of the ridge member will permit of the disconnection of the tooth bars or members and their arrangement in close relation for packing or storing. The latter peculiarity of course has the further advantage of minimizing expense in transportation.

Having described the invention, I claim:

1. A harrow having a plurality of flexibly connected tooth bars and a ridge member for holding said tooth bars in their operative relations, said ridge member consisting of relatively adjustable pivotally connected elements provided at their remote extremities with means for engaging the marginal tooth bars, one of said elements being provided with a clamp for receiving the free inner end of the other element, and a locking device for maintaining engagement of the clamp with said element.

2. A harrow having a plurality of flexibly connected tooth bars of which the marginal bars are provided at their outer sides with a staple and a rocking shackle, and a ridge member consisting of pivotally connected elements, one of which is provided with a depending hook for engagement with said staple on one of the marginal tooth bars, and the other of which is provided with a depending pin for engagement with said rocking shackle, means for securing said pin in engagement with the shackle, and clamping devices for holding the elements of the ridge member in alined relation.

3. A harrow having a plurality of transverse tooth bars provided with forwardly and rearwardly extending staples, hooks loosely connected with the staples on one side of each tooth bar for engagement with the staples on the adjacent bar, the staples on facing sides of adjacent bars being deflected in opposite directions to dispose the shanks of said hooks in parallelism with the plane of the series of toothed bars, a ridge member having adjustably connected elements for engagement at their remote extremities with the marginal tooth bars, and clamping means for securing the elements of the ridge member in their alined relation, the pivotal connection between said elements being adjustable relative to the length of one of the elements.

In testimony whereof I affix my signature in presence of two witnesses.

EARL G. COLLINS.

Witnesses:
DOUGLAS GRAHAM,
IRENE LLOYD.